US012766928B2

(12) United States Patent
Song et al.

(10) Patent No.: US 12,766,928 B2
(45) Date of Patent: Oct. 20, 2026

(54) VEHICLE THERMAL MANAGEMENT SYSTEM AND METHOD FOR CONTROLLING THE SAME

(71) Applicants: Hyundai Motor Company, Seoul (KR); Kia Corporation, Seoul (KR)

(72) Inventors: Jae Hyun Song, Yongin-Si (KR); Kwang Weon Ahn, Hwaseong-Si (KR); Tae Han Kim, Seoul (KR); Je Pil Joung, Gwangmyeong-Si (KR); Hwan Yeui Hong, Hwaseong-Si (KR); Sang Won Lee, Anyang-Si (KR); Sung Hyun Moon, Seoul (KR); Se Hwan Choi, Pohang-Si (KR); Jong Moon Won, Hwaseong-Si (KR); Seo Jung Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 227 days.

(21) Appl. No.: 18/658,631

(22) Filed: May 8, 2024

(65) Prior Publication Data

US 2025/0170876 A1 May 29, 2025

(30) Foreign Application Priority Data

Nov. 24, 2023 (KR) ........................ 10-2023-0165180

(51) Int. Cl.
*B60H 1/32* (2006.01)

(52) U.S. Cl.
CPC ....... *B60H 1/32284* (2019.05); *B60H 1/3216* (2013.01)

(58) Field of Classification Search
CPC .......................... B60H 1/32284; B60H 1/3216
See application file for complete search history.

(56) References Cited

U.S. PATENT DOCUMENTS

| | | | | |
|---|---|---|---|---|
| 2020/0180391 A1* | 6/2020 | Kim | .................... | B60H 1/00278 |
| 2020/0353795 A1* | 11/2020 | Choi | .................. | B60H 1/00278 |
| 2022/0355645 A1* | 11/2022 | Jeong | ................. | B60H 1/00664 |
| 2024/0278619 A1* | 8/2024 | Shibaoka | ........... | B60H 1/00914 |

* cited by examiner

*Primary Examiner* — Larry L Furdge
(74) *Attorney, Agent, or Firm* — MORGAN, LEWIS & BOCKIUS LLP

(57) ABSTRACT

A vehicle thermal management system, includes: a refrigerant subsystem including a refrigerant circulation path; a first coolant subsystem including a first coolant circulation path and a PE component fluidly connected to the first coolant circulation path; a second coolant subsystem including a second coolant circulation path and a radiator and a pump fluidly connected to the second coolant circulation path; a heat exchanger including a refrigerant passage fluidly connected to the refrigerant circulation path, a first coolant passage fluidly connected to the first coolant circulation path, and a second coolant passage fluidly connected to the second coolant circulation path; and a controller configured for controlling the pump of the second coolant subsystem based on a temperature of a refrigerant flowing into the refrigerant passage of the heat exchanger and a temperature of a second coolant flowing into the second coolant passage of the heat exchanger.

17 Claims, 3 Drawing Sheets

VEHICLE THERMAL MANAGEMENT SYSTEM AND METHOD FOR CONTROLLING THE SAME

CROSS-REFERENCE TO RELATED APPLICATION

The present application claims priority to Korean Patent Application No. 10-2023-0165180, filed on Nov. 24, 2023, the entire contents of which is incorporated herein for all purposes by this reference.

BACKGROUND OF THE PRESENT DISCLOSURE

Field of the Present Disclosure

The present disclosure relates to a vehicle thermal management system and a method for controlling the same, and more particularly, to a vehicle thermal management system and a method for controlling the same designed to prevent thermal energy loss of a refrigerant in a heat exchanger thermally connecting first and second coolant subsystems and a refrigerant subsystem.

Description of Related Art

With a growing interest in energy efficiency and environmental issues, there is a demand for development of eco-friendly vehicles that can replace internal combustion engine vehicles. Such eco-friendly vehicles are classified into electric vehicles which are driven using fuel cells or electricity as a power source and hybrid vehicles which are driven using an engine and a battery.

The eco-friendly vehicles may include a vehicle thermal management system for heating, ventilation, and air conditioning (HVAC) in a cabin (or passenger compartment) and maintaining a battery and/or power electronics (PE) components at appropriate temperatures. The vehicle thermal management system may include a refrigerant subsystem thermally connected to the cabin, a first coolant subsystem thermally connected to the PE components, a second coolant subsystem fluidly connected to a radiator, and a third coolant subsystem fluidly connected to the battery. The second coolant subsystem and the third coolant subsystem may be fluidly connected to or separated from each other by a control valve.

Furthermore, the vehicle thermal management system may include a heat exchanger by which the refrigerant subsystem, the first coolant subsystem, and the second coolant subsystem are thermally connected. The heat exchanger may include a refrigerant passage fluidly connected to the refrigerant subsystem, a first coolant passage fluidly connected to the first coolant subsystem, and a second coolant passage fluidly connected to the second coolant subsystem. When the refrigerant subsystem operates in a heating mode for heating the cabin, a refrigerant passing through the refrigerant passage of the heat exchanger may absorb heat from a first coolant passing through the first coolant passage of the heat exchanger and a second coolant passing through the second coolant passage of the heat exchanger so that the refrigerant passing through the refrigerant passage may be evaporated, and the first coolant passing through the first coolant passage and the second coolant passing through the second coolant passage may be cooled. When the temperature of the refrigerant passing through the refrigerant passage is lower than the temperature of the first coolant passing through the first coolant passage and the temperature of the second coolant passing through the second coolant passage, the refrigerant may stably absorb heat from the first coolant and the second coolant.

However, when the vehicle is driving in a state in which the refrigerant subsystem operates in the heating mode, the temperature of the PE component may continue to increase so that the temperature (saturation temperature) of the refrigerant in the heat exchanger may be relatively increased by the first coolant, and the second coolant may exchange heat with ambient air through the radiator so that the temperature of the second coolant may be relatively lowered. Accordingly, since the temperature of the refrigerant is relatively increased above the temperature of the second coolant, heat may be released from the refrigerant to the second coolant. That is, when the vehicle is driving in a state in which the refrigerant subsystem operates in the heating mode, heat in the heat exchanger may be released from the refrigerant to the second coolant, leading to thermal energy loss of the refrigerant in the heat exchanger. Accordingly, the refrigerant may not be sufficiently evaporated in the heat exchanger, and thus cabin heating performance of the refrigerant subsystem may be relatively reduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle thermal management system and a method for controlling the same designed to prevent thermal energy loss of a refrigerant in a heat exchanger thermally connecting first and second coolant subsystems and a refrigerant subsystem, relatively improving cabin heating performance of the refrigerant subsystem.

According to an aspect of the present disclosure, a vehicle thermal management system may include: a refrigerant subsystem including a refrigerant circulation path; a first coolant subsystem including a first coolant circulation path and a power electronics (PE) component fluidly connected to the first coolant circulation path; a second coolant subsystem including a second coolant circulation path and a radiator and a pump fluidly connected to the second coolant circulation path; a heat exchanger including a refrigerant passage fluidly connected to the refrigerant circulation path of the refrigerant subsystem, a first coolant passage fluidly connected to the first coolant circulation path of the first coolant subsystem, and a second coolant passage fluidly connected to the second coolant circulation path of the second coolant subsystem; and a controller configured to control the pump of the second coolant subsystem based on a temperature of a refrigerant flowing into the refrigerant passage of the heat exchanger and a temperature of a second coolant flowing into the second coolant passage of the heat exchanger.

The controller may be configured to stop the pump of the second coolant subsystem when the temperature of the refrigerant flowing into the refrigerant passage of the heat exchanger is higher than the temperature of the second coolant flowing into the second coolant passage of the heat exchanger.

The controller may be configured to stop the pump of the second coolant subsystem when an inlet-side refrigerant temperature detected at an inlet of the refrigerant passage of the heat exchanger is higher than an inlet-side coolant temperature detected at an inlet of the second coolant passage of the heat exchanger.

The vehicle thermal management system may further include: a first sensor disposed on the downstream side of the radiator; and a second sensor disposed on the upstream side of a compressor of the refrigerant subsystem. The controller may be configured to calculate a saturation temperature of the refrigerant passing through the refrigerant passage of the heat exchanger based on a suction pressure of the compressor detected by the second sensor.

The controller may be configured to stop the pump of the second coolant subsystem when a sum of the calculated saturation temperature of the refrigerant and a correction temperature is higher than a coolant temperature detected by the first sensor.

The first coolant subsystem may further include: a PE radiator fluidly connected to the first coolant circulation path; a bypass line connected to the first coolant circulation path at upstream and downstream of the PE radiator and allowing a first coolant to bypass the PE radiator; and a control valve configured to adjust the flow of the first coolant between the bypass line and the PE radiator.

The controller may be configured to control the control valve to allow the first coolant to bypass the PE radiator through the bypass line when a temperature difference between a temperature of the PE component and an ambient temperature is greater than a first threshold.

The controller may be configured to stop the pump of the second coolant subsystem when the temperature difference between the temperature of the PE component and the ambient temperature is greater than a second threshold. The second threshold may be greater than the first threshold.

The controller may be configured to operate the pump of the second coolant subsystem when the temperature difference between the temperature of the PE component and the ambient temperature is less than or equal to a third threshold. The third threshold may be less than the first threshold.

According to another aspect of the present disclosure, a method for controlling a vehicle thermal management system including a refrigerant subsystem including a refrigerant circulation path, a first coolant subsystem including a first coolant circulation path and a PE component fluidly connected to the first coolant circulation path, a second coolant subsystem including a second coolant circulation path and a radiator and a pump fluidly connected to the second coolant circulation path, and a heat exchanger including a refrigerant passage fluidly connected to the refrigerant circulation path of the refrigerant subsystem, a first coolant passage fluidly connected to the first coolant circulation path of the first coolant subsystem, and a second coolant passage fluidly connected to the second coolant circulation path of the second coolant subsystem may include: calculating, by a controller, a temperature of a refrigerant flowing into the refrigerant passage of the heat exchanger and a temperature of a second coolant flowing into the second coolant passage of the heat exchanger; and controlling, by the controller, the pump of the second coolant subsystem based on the temperature of the refrigerant flowing into the refrigerant passage of the heat exchanger, the temperature of the second coolant flowing into the second coolant passage of the heat exchanger, and a temperature difference between a temperature of the PE component and an ambient temperature.

The controlling of the pump may include stopping the pump of the second coolant subsystem when the temperature of the refrigerant flowing into the refrigerant passage of the heat exchanger is higher than the temperature of the second coolant flowing into the second coolant passage of the heat exchanger.

The controlling of the pump may include stopping the pump of the second coolant subsystem when an inlet-side refrigerant temperature detected at an inlet of the refrigerant passage of the heat exchanger is higher than an inlet-side coolant temperature detected at an inlet of the second coolant passage of the heat exchanger.

The controlling of the pump may include calculating a saturation temperature of the refrigerant passing through the refrigerant passage of the heat exchanger based on a suction pressure of a compressor of the refrigerant subsystem detected by a second sensor disposed on the upstream side of the compressor.

The controlling of the pump may include stopping the pump of the second coolant subsystem when a sum of the calculated saturation temperature of the refrigerant and a correction temperature is higher than a coolant temperature detected by a first sensor disposed on the downstream side of the radiator.

The controlling of the pump may include controlling a control valve to allow a first coolant to bypass a PE radiator fluidly connected to the first coolant circulation path through a bypass line when the temperature difference between the temperature of the PE component and the ambient temperature is greater than a first threshold.

The controlling of the pump may include stopping the pump of the second coolant subsystem when the temperature difference between the temperature of the PE component and the ambient temperature is greater than a second threshold. The second threshold may be greater than the first threshold.

The controlling of the pump may include operating the pump of the second coolant subsystem when the temperature difference between the temperature of the PE component and the ambient temperature is less than or equal to a third threshold. The third threshold may be less than the first threshold.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
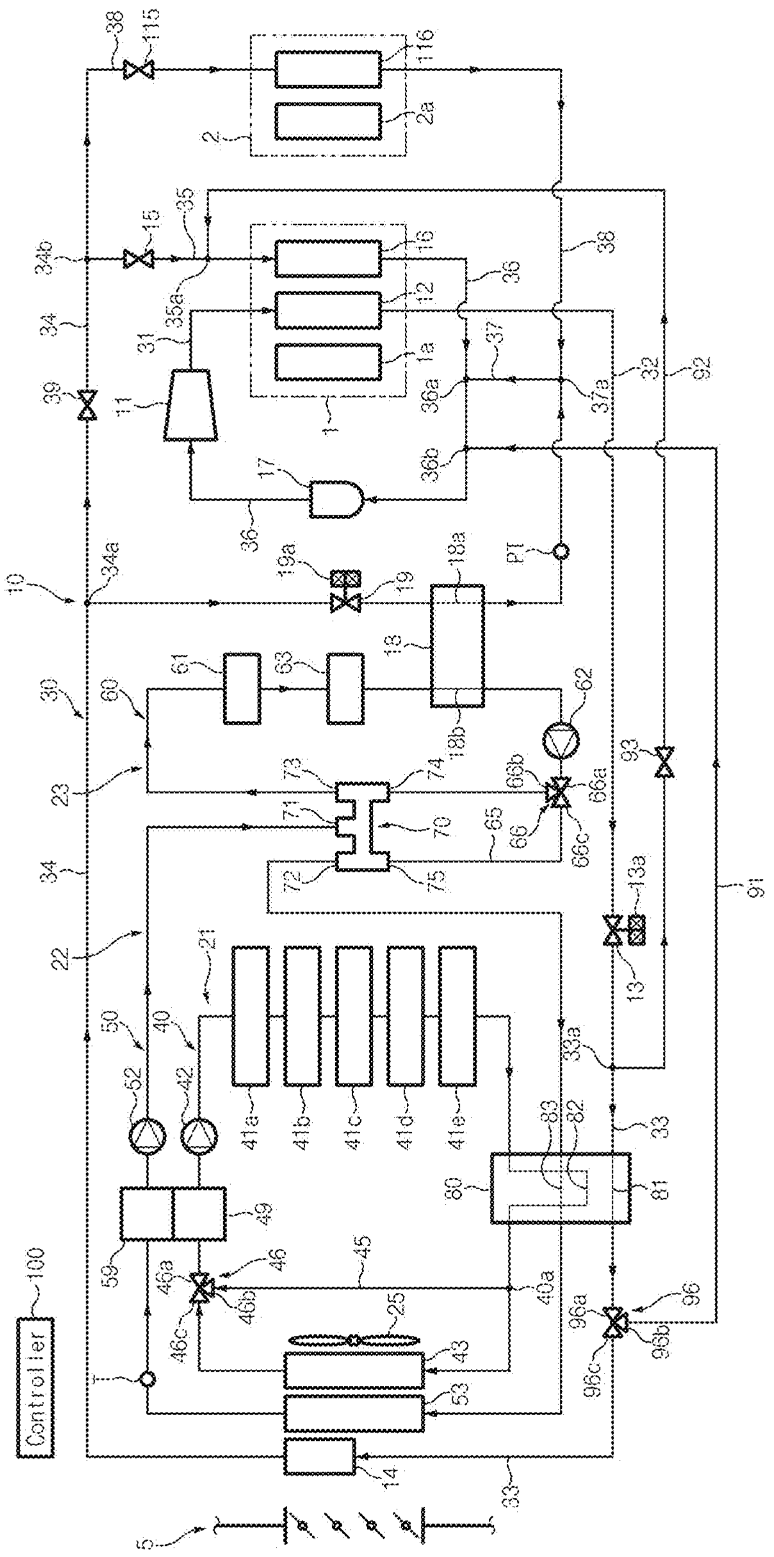
FIG. 1 illustrates a vehicle thermal management system according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, include the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a refrigerant subsystem 10 thermally connected to a cabin (or passenger compartment), a first coolant subsystem 21 thermally connected to power electronics (PE) components 41*a*, 41*b*, 41*c*, 41*d*, and 41*e*, a second coolant subsystem 22 thermally connected to a radiator 53, and a third coolant subsystem 23 thermally connected to a battery 61.

The vehicle thermal management system according to an exemplary embodiment of the present disclosure may include a heat exchanger 80 by which the refrigerant subsystem 10, the first coolant subsystem 21, and the second coolant subsystem 22 are thermally connected to each other. The heat exchanger 80 may be configured to transfer heat between a refrigerant circulating in the refrigerant subsystem 10, a first coolant circulating in the first coolant subsystem 21, and a second coolant circulating in the second coolant subsystem 22. The heat exchanger 80 may include a refrigerant passage 81 fluidly connected to a refrigerant circulation path 30 of the refrigerant subsystem 10, a first coolant passage 82 fluidly connected to a first coolant circulation path 40 of the first coolant subsystem 21, and a second coolant passage 83 fluidly connected to a second coolant circulation path 50 of the second coolant subsystem 22.

The refrigerant subsystem 10 may be configured to heat or cool the air flowing into the cabin of the vehicle using the refrigerant circulating in the refrigerant circulation path 30. The refrigerant circulation path 30 may be configured to fluidly connect a compressor 11, an internal condenser 12, a heating-side expansion valve 13, the heat exchanger 80, an external heat exchanger 14, a cooling-side expansion valve 15, and an evaporator 16. The refrigerant circulation path 30 may be configured to vary the flow of the refrigerant depending on various operating modes of the vehicle thermal management system.

The compressor 11 may be configured to compress the refrigerant to thereby allow the refrigerant to circulate. According to an exemplary embodiment of the present disclosure, the compressor 11 may be an electric compressor driven by electrical energy.

The refrigerant subsystem 10 may include an accumulator 17 disposed on the upstream side of the compressor 11. The accumulator 17 may separate a liquid refrigerant from the refrigerant received from the refrigerant passage 81 of the heat exchanger 80 and/or the evaporator 16, preventing the liquid refrigerant from flowing into the compressor 11.

The internal condenser 12 may be located on the downstream side of the compressor 11, and the internal condenser 12 may be configured to condense the refrigerant received from the compressor 11. That is, the refrigerant compressed by the compressor 11 may transfer heat to the air and be condensed in the internal condenser 12. Accordingly, the internal condenser 12 may heat the air using the refrigerant compressed by the compressor 11, and the air heated by the internal condenser 12 may be directed into the cabin so that the cabin may be heated. The internal condenser 12 may correspond to a heater core of a Heating, Ventilation, and Air Conditioning (HVAC) system of an internal combustion engine vehicle.

The heating-side expansion valve 13 may be disposed on the downstream side of the internal condenser 12. When the refrigerant subsystem 10 operates in a heating mode for heating the cabin, the heating-side expansion valve 13 may be configured to adjust the flow of the refrigerant and/or the flow rate of the refrigerant into the refrigerant passage 81 of the heat exchanger 80, and expand the refrigerant.

According to an exemplary embodiment of the present disclosure, the heating-side expansion valve 13 may be an electronic expansion valve (EXV) including an actuator 13*a*. The actuator 13*a* may include a shaft which is movable to open or close an orifice defined in a valve body of the heating-side expansion valve 13, and the position of the shaft may be varied depending on the rotation direction, rotation degree, and the like of the actuator 13*a*, and accordingly the opening amount of the orifice of the heating-side expansion valve 13 may be varied. A controller 100 may be configured for controlling the operation of the actuator 13*a*. The heating-side expansion valve 13 may be a full open type EXV. When the refrigerant subsystem 10 does not operate in the heating mode, the heating-side expansion valve 13 may be fully opened (the opening amount of the heating-side expansion valve 13 may be 100%). Accordingly, when the refrigerant passes through the heating-side expansion valve 13, the refrigerant may not be expanded by the heating-side expansion valve 13.

The external heat exchanger 14 may be located on the downstream side of the refrigerant passage 81 of the heat exchanger 80, and the external heat exchanger 14 may include a refrigerant passage through which the refrigerant passes. The external heat exchanger 14 may be disposed adjacent to a front grille of the vehicle, and the external heat exchanger 14 may be configured to contact with the air flowing into the front grille of the vehicle. The external heat exchanger 14 may be configured to transfer heat between the refrigerant and the ambient air. The external heat exchanger 14 may exchange heat with the ambient air forcibly blown by a cooling fan 25 so that a heat transfer rate between the external heat exchanger 14 and the ambient air may be further increased.

The cooling-side expansion valve 15 may be located on the downstream side of the external heat exchanger 14, and the cooling-side expansion valve 15 may be located on the upstream side of the evaporator 16. The cooling-side expansion valve 15 may be configured to adjust the flow of the refrigerant and/or the flow rate of the refrigerant into the evaporator 16, and expand the refrigerant received from the external heat exchanger 14 during a cooling operation of a Heating, Ventilation, and Air Conditioning (HVAC) system. According to an exemplary embodiment of the present disclosure, the cooling-side expansion valve 15 may be a thermal expansion valve (TXV) which detects the temperature and/or pressure of the refrigerant and adjusts the opening amount of the cooling-side expansion valve 15.

The evaporator 16 may be disposed on the downstream side of the cooling-side expansion valve 15, and receive the refrigerant expanded by the cooling-side expansion valve 15. The evaporator 16 may be configured to cool the air using the refrigerant received from the cooling-side expansion valve 15. That is, the refrigerant expanded by the cooling-side expansion valve 15 may absorb heat from the air and be evaporated in the evaporator 16. During the cooling operation of the HVAC system, the evaporator 16 may be configured to cool the air flowing into the cabin using the refrigerant expanded by the cooling-side expansion valve 15.

The refrigerant circulation path 30 may include a first refrigerant line 31 extending from an outlet of the compressor 11 to the internal condenser 12, a second refrigerant line 32 extending from the internal condenser 12 to the heating-side expansion valve 13, a third refrigerant line 33 extending from the heating-side expansion valve 13 to an inlet of the external heat exchanger 14, a fourth refrigerant line 34 extending from an outlet of the external heat exchanger 14 to the cooling-side expansion valve 15, a fifth refrigerant line 35 extending from the cooling-side expansion valve 15 to an inlet of the evaporator 16, and a sixth refrigerant line 36 extending from an outlet of the evaporator 16 to an inlet of the compressor 11.

The refrigerant subsystem 10 may include a distribution line 37 fluidly connected to the refrigerant circulation path 30, and the distribution line 37 may connect an upstream point of the cooling-side expansion valve 15 and an upstream point of the compressor 11. An inlet of the distribution line 37 may be connected to a first connection point **34*a* of the fourth refrigerant line 34 at the upstream point of the cooling-side expansion valve 15, and an outlet of the distribution line 37 may be connected to a connection point 36*a* of the sixth refrigerant line 36 at the upstream point of the compressor 11. The distribution line 37 may be configured to allow at least a portion of the refrigerant discharged from the external heat exchanger 14 to bypass the cooling-side expansion valve 15 and the evaporator 16**.

The vehicle thermal management system according to an exemplary embodiment of the present disclosure may include a battery chiller 18 thermally connecting the distribution line 37 of the refrigerant circulation path 30 and a third coolant circulation path 60 of the third coolant subsystem 23. The battery chiller 18 may be fluidly connected to the distribution line 37, and the battery chiller 18 may be configured to transfer heat between the refrigerant passing through the distribution line 37 and the coolant passing through the third coolant circulation path 60 of the third coolant subsystem 23. The battery chiller 18 may include a refrigerant passage **18*a* fluidly connected to the distribution line 37 of the refrigerant circulation path 30, and a coolant passage 18*b* fluidly connected to the third coolant circulation path 60 of the third coolant subsystem 23. The refrigerant passing through the refrigerant passage 18*a* may absorb heat from the coolant passing through the coolant passage 18*b***, and accordingly the refrigerant may be evaporated, and the coolant may be cooled.

Furthermore, a chiller-side expansion valve 19 may be located on the upstream side of the battery chiller 18. The chiller-side expansion valve 19 may be configured to adjust the flow of the refrigerant and/or the flow rate of the refrigerant into the battery chiller 18, and expand the refrigerant received from the external heat exchanger 14.

According to an exemplary embodiment of the present disclosure, the chiller-side expansion valve 19 may be an EXV including an actuator **19*a*. The actuator 19*a* may include a shaft which is movable to open or close an orifice defined in a valve body of the chiller-side expansion valve 19, and the position of the shaft may be varied depending on the rotation direction, rotation degree, and the like of the actuator 19*a*, and accordingly the opening amount of the orifice of the chiller-side expansion valve 19 may be varied. The controller 100 may be configured for controlling the operation of the actuator 19*a*. The chiller-side expansion valve 19 may be a full open type EXV. As the opening amount of the chiller-side expansion valve 19 is varied, the flow rate of the refrigerant into the refrigerant passage 18*a* of the battery chiller 18 may be varied. As the opening amount of the cooling-side expansion valve 15 and the opening amount of the chiller-side expansion valve 19 are adjusted, the refrigerant may be distributed to the evaporator 16 and the battery chiller 18** at a predetermined ratio.

The vehicle thermal management system according to an exemplary embodiment of the present disclosure may include a front HVAC housing 1 in which the internal condenser 12 and the evaporator 16 are received. The front HVAC housing 1 may be disposed to face a front-seat region of the cabin, the evaporator 16 may be configured to evaporate the refrigerant to thereby cool the air flowing into the front-seat region of the cabin, and the internal condenser 12 may be configured to condense the refrigerant to thereby heat the air flowing into the front-seat region of the cabin. A front electric heater **1*a* may be disposed adjacent to the internal condenser 12, and the front electric heater 1*a* may be a positive temperature coefficient (PTC) heater. When the heating of the front-seat region of the cabin is required, the front electric heater 1*a* may operate to heat the air passing through the front HVAC housing 1. An air mixing door may be disposed between the evaporator 16 and the internal condenser 12. As the position of the air mixing door is varied, the flow rate of the air cooled by the evaporator 16 and the flow rate of the air heated by the internal condenser 12** may be mixed at a predetermined ratio.

The refrigerant subsystem 10 may include a rear connection line 38 fluidly connected to the refrigerant circulation path 30, and the rear connection line 38 may connect an upstream point of the cooling-side expansion valve 15 and the distribution line 37. An inlet of the rear connection line 38 may be connected to a second connection point 34b of the fourth refrigerant line 34 at the upstream point of the cooling-side expansion valve 15, and the second connection point 34b may be located on the downstream side of the first connection point 34a. An outlet of the rear connection line 38 may be connected to a connection point 37a of the distribution line 37 at an upstream point of the compressor 11. The rear connection line 38 may be configured to allow at least a portion of the refrigerant discharged from the external heat exchanger 14 to bypass the cooling-side expansion valve 15 and the evaporator 16.

The vehicle thermal management system according to an exemplary embodiment of the present disclosure may include a rear evaporator 116 fluidly connected to the rear connection line 38 and a rear HVAC housing 2 in which the rear evaporator 116 is received. The rear HVAC housing 2 may be disposed to face a rear-seat region of the cabin, and the rear evaporator 116 may be configured to evaporate the refrigerant to thereby cool the air flowing into the rear-seat region of the cabin. A rear electric heater 2a may be disposed adjacent to the rear evaporator 116, and the rear electric heater 2a may be a PTC heater. When the heating of the rear-seat region of the cabin is required, the rear electric heater 2a may operate to heat the air passing through the rear HVAC housing 2.

The refrigerant subsystem 10 may include a rear-side expansion valve 115 located on the upstream side of the rear evaporator 116. The rear-side expansion valve 115 may be configured to adjust the flow of the refrigerant and/or the flow rate of the refrigerant into the rear evaporator 116, and expand the refrigerant received from the external heat exchanger 14 during the cooling operation of the HVAC system. According to an exemplary embodiment of the present disclosure, the rear-side expansion valve 115 may be a TXV which detects the temperature and/or pressure of the refrigerant and adjusts the opening amount of the rear-side expansion valve 115.

The refrigerant subsystem 10 may include a shut-off valve 39 located on the upstream side of the cooling-side expansion valve 15 and the rear-side expansion valve 115. When the shut-off valve 39 is opened, the refrigerant may be directed to the cooling-side expansion valve 15 and the rear-side expansion valve 115. When the shut-off valve 39 is closed, the refrigerant may not be directed to the cooling-side expansion valve 15 and the rear-side expansion valve 115.

The refrigerant subsystem 10 may include a heating-side bypass line 91 connecting a downstream point of the refrigerant passage 81 of the heat exchanger 80 and an upstream point of the compressor 11. An inlet of the heating-side bypass line 91 may be connected to the third refrigerant line 33 of the refrigerant circulation path 30 at the downstream point of the refrigerant passage 81 of the heat exchanger 80, and an outlet of the heating-side bypass line 91 may be connected to a connection point 36b of the sixth refrigerant line 36 of the refrigerant circulation path 30 at the upstream point of the compressor 11.

A control valve 96 may be disposed at the inlet of the heating-side bypass line 91, and the control valve 96 may be located between the external heat exchanger 14 and the refrigerant passage 81 of the heat exchanger 80. The control valve 96 may be configured to control the flow of the refrigerant between the heat exchanger 80, the external heat exchanger 14, and the compressor 11.

The control valve 96 may include a first port 96a fluidly communicating with the refrigerant passage 81 of the heat exchanger 80, a second port 96b fluidly communicating with the heating-side bypass line 91, and a third port 96c fluidly communicating with the external heat exchanger 14. The control valve 96 may be configured to fluidly connect the first port 96a to at least one of the second port 96b and the third port 96c under control of the controller 100.

When the control valve 96 fluidly connects the first port 96a to the third port 96c by the controller 100, the refrigerant discharged from the refrigerant passage 81 of the heat exchanger 80 may be directed to the external heat exchanger 14.

When the control valve 96 fluidly connects the first port 96a to the second port 96b by the controller 100, the refrigerant discharged from the refrigerant passage 81 of the heat exchanger 80 may be directed to the compressor 11 through the heating-side bypass line 91.

The refrigerant subsystem 10 may further include a dehumidification-side bypass line 92 connecting an upstream point of the refrigerant passage 81 of the heat exchanger 80 and an upstream point of the evaporator 16. An inlet of the dehumidification-side bypass line 92 may be connected to a connection point 33a of the third refrigerant line 33 of the refrigerant circulation path 30 between the refrigerant passage 81 of the heat exchanger 80 and the heating-side expansion valve 13, and an outlet of the dehumidification-side bypass line 92 may be connected to a connection point 35a of the fifth refrigerant line 35 of the refrigerant circulation path 30 at the upstream point of the evaporator 16. A dehumidification-side bypass valve 93 may be provided to open or close the dehumidification-side bypass line 92. When the dehumidification-side bypass valve 93 is opened, the refrigerant may be directed to the evaporator 16 through the dehumidification-side bypass line 92. When dehumidification in the cabin is required in the heating mode of the refrigerant subsystem 10, the dehumidification-side bypass valve 93 may be opened to allow at least a portion of the refrigerant discharged from the heating-side expansion valve 13 to be directed to the evaporator 16 through the dehumidification-side bypass line 92. Accordingly, a portion of the refrigerant directed to the evaporator 16 may cool the air passing by an external surface of the evaporator 16, dehumidifying the air. Thus, the heating and dehumidification of the cabin may be performed simultaneously.

The first coolant subsystem 21 may be configured to cool the PE components 41a, 41b, 41c, 41d, and 41e by the first coolant circulating in the first coolant circulation path 40. The first coolant circulation path 40 may be fluidly connected to the PE components 41a, 41b, 41c, 41d, and 41e, a pump 42, a PE radiator 43, the first coolant passage 82 of the heat exchanger 80, and a reservoir 49.

According to an exemplary embodiment of the present disclosure, the PE components 41a, 41b, 41c, 41d, and 41e may include a front-wheel-side inverter 41a, an integrated charging control unit (ICCU) 41b, a rear-wheel-side inverter 41c, a rear-wheel-side motor 41d or a rear-wheel-side motor cooler fluidly connected to the rear-wheel-side motor 41d, and a front-wheel-side motor 41e or a front-wheel-side motor cooler fluidly connected to the front-wheel-side motor 41e.

Each of the PE components 41a, 41b, 41c, 41d, and 41e may include a coolant passage provided inside or outside thereof, and the first coolant may pass through the coolant passage. The first coolant circulation path 40 may be fluidly connected to the coolant passage of each of the PE components 41a, 41b, 41c, 41d, and 41e.

The PE radiator 43 may be disposed adjacent to the front grille of the vehicle, and the PE radiator 43 may be cooled using the ambient air forcibly blown by the cooling fan 25.

The reservoir 49 may be located between an outlet of the PE radiator 43 and an inlet of the pump 42. The reservoir 49 may temporarily store and replenish the first coolant so that the flow rate of the first coolant circulating in the first coolant circulation path 40 may be constantly maintained.

The pump 42 may be disposed on the upstream side of the PE components 41*a*, 41*b*, 41*c*, 41*d*, and 41*e*.

The first coolant subsystem 21 may further include a bypass line 45 allowing the first coolant to bypass the PE radiator 43, and the bypass line 45 may be fluidly connected to the first coolant circulation path 40. The bypass line 45 may be configured to directly connect an upstream point of the PE radiator 43 and a downstream point of the PE radiator 43 so that the first coolant may be allowed to bypass the PE radiator 43 through the bypass line 45.

An inlet of the bypass line 45 may be fluidly connected to the first coolant circulation path 40 at a point between an inlet of the PE radiator 43 and the first coolant passage 82 of the heat exchanger 80. An outlet of the bypass line 45 may be fluidly connected to the first coolant circulation path 40 at a point between the outlet of the PE radiator 43 and the pump 42.

The first coolant subsystem 21 may include a control valve 46 disposed at the outlet of the bypass line 45. The control valve 46 may be configured to control the flow of the first coolant between the bypass line 45, the PE radiator 43, and the pump 42. The control valve 46 may include a first port 46*a* fluidly communicating with the pump 42, a second port 46*b* fluidly communicating with the bypass line 45, and a third port 46*c* fluidly communicating with the outlet of the PE radiator 43. The control valve 46 may be configured to fluidly connect the first port 46*a* to at least one of the second port 46*b* and the third port 46*c* under control of the controller 100.

When the control valve 46 fluidly connects the first port 46*a* to the third port 46*c*, the first coolant discharged from the PE radiator 43 may be directed to the reservoir 49. Accordingly, the first coolant may circulate through the PE components 41*a*, 41*b*, 41*c*, 41*d*, and 41*e*, the first coolant passage 82 of the heat exchanger 80, the PE radiator 43, and the reservoir 49 by the pump 42 without passing through the bypass line 45.

When the control valve 46 fluidly connects the first port 46*a* to the second port 46*b*, the first coolant may pass through the bypass line 45 so that the first coolant may bypass the PE radiator 43, and the first coolant may circulate through the PE components 41*a*, 41*b*, 41*c*, 41*d*, and 41*e*, the first coolant passage 82 of the heat exchanger 80, and the reservoir 49 by the pump 42.

The second coolant subsystem 22 may be thermally connected to the refrigerant subsystem 10 through the heat exchanger 80. The second coolant subsystem 22 may include the second coolant circulation path 50 through which the second coolant circulates. The second coolant circulation path 50 may be fluidly connected to the radiator 53, a reservoir 59, a pump 52, and the second coolant passage 83 of the heat exchanger 80.

The radiator 53 may be disposed adjacent to the front grille of the vehicle, and the radiator 53 may be cooled using the ambient air forcibly blown by the cooling fan 25. The radiator 53 may be adjacent to the external heat exchanger 14. The external heat exchanger 14, the radiator 53, and the PE radiator 43 may be disposed adjacent to each other on the front of the vehicle, and accordingly the external heat exchanger 14, the radiator 53, and the PE radiator 43 may contact with the ambient air. The cooling fan 25 may be disposed behind the external heat exchanger 14, the radiator 53, and the PE radiator 43. An active air flap 5 may be provided to open or close the front grille of the vehicle by the controller 100. As the active air flap 5 is opened, the ambient air may directly contact with the external heat exchanger 14, the radiator 53, and the PE radiator 43 through the front grille of the vehicle so that the external heat exchanger 14, the radiator 53, and the PE radiator 43 may directly exchange heat with the ambient air. As the active air flap 5 is closed, the ambient air may not be directed to the external heat exchanger 14, the radiator 53, the PE radiator 43 so that the external heat exchanger 14, the radiator 53, and the PE radiator 43 may not exchange heat with the ambient air.

The reservoir 59 may be located between an outlet of the radiator 53 and an inlet of the pump 52. The reservoir 59 may temporarily store and replenish the second coolant so that the flow rate of the second coolant circulating in the second coolant circulation path 50 may be constantly maintained.

The pump 52 may be disposed on the downstream side of the reservoir 59, and the second coolant may circulate through the second coolant circulation path 50 by the pump 52.

The second coolant passage 83 of the heat exchanger 80 may be fluidly connected to the second coolant circulation path 50 at an upstream point of the radiator 53.

The third coolant subsystem 23 may be configured to cool or warm up the battery 61 using a third coolant circulating through the third coolant circulation path 60. The third coolant circulation path 60 may be fluidly connected to the battery 61, a battery warmer 63, the coolant passage 18*b* of the battery chiller 18, and a pump 62.

The battery 61 may include a coolant passage provided inside or outside thereof, and the third coolant may pass through the coolant passage. As the third coolant passes through the coolant passage of the battery 61, the battery 61 may be cooled or warmed up by the third coolant.

The battery warmer 63 may be disposed between the battery 61 and the coolant passage 18*b* of the battery chiller 18. The battery warmer 63 may heat the third coolant circulating in the third coolant circulation path 60 so that the battery 61 may be warmed up by the heated third coolant. According to an exemplary embodiment of the present disclosure, the battery warmer 63 may be an electric heater. According to another exemplary embodiment of the present disclosure, the battery warmer 63 may be a heater configured to heat the third coolant by exchanging heat with a high-temperature fluid.

The coolant passage 18*b* of the battery chiller 18 may be disposed on the downstream side of the battery warmer 63.

The pump 62 may be disposed on the downstream side of the coolant passage 18*b* of the battery chiller 18, and the third coolant may circulate through the third coolant circulation path 60 by the pump 62.

The second coolant subsystem 22 and the third coolant subsystem 23 may be fluidly connected to or separated from each other through a connection line 65, a connector 70, and a control valve 66.

The connection line 65 may be configured to connect the second coolant circulation path 50 and the third coolant circulation path 60. An inlet of the connection line 65 may be connected to the third coolant circulation path 60 at a downstream point of the pump 62, and an outlet of the connection line 65 may be connected to the second coolant circulation path 50 at a downstream point of the second coolant passage 83 of the heat exchanger 80.

The connector 70 may include a first port 71 fluidly communicating with the pump 52 of the second coolant subsystem 22, a second port 72 fluidly communicating with the second coolant passage 83 of the heat exchanger 80, a third port 73 fluidly communicating with an inlet of the coolant passage of the battery 61, a fourth port 74 fluidly communicating with an outlet of the pump 62, and a fifth port 75 fluidly communicating with the connection line 65.

The control valve 66 may be configured to control the flow of the second coolant and the third coolant between the second coolant circulation path 50 of the second coolant subsystem 22 and the third coolant circulation path 60 of the third coolant subsystem 23. The control valve 66 may include a first port 66*a* fluidly communicating with the coolant passage 18*b* of the battery chiller 18, a second port 66*b* fluidly communicating with the fourth port 74 of the connector 70, and a third port 66*c* fluidly communicating with the inlet of the connection line 65.

The control valve 66 may be configured to fluidly connect the first port 66*a* to at least one of the second port 66*b* and the third port 66*c* or to close the first port 66*a*, the second port 66*b*, and the third port 66*c* under control of the controller 100.

When the control valve 66 fluidly connects the first port 66*a* to the second port 66*b* and closes the third port 66*c* by the controller 100, the second coolant circulation path 50 and the third coolant circulation path 60 may be fluidly separated from each other, and accordingly the third coolant discharged from the coolant passage 18*b* of the battery chiller 18 may be directed to the battery 61 through the fourth port 74 and the third port 73 of the connector 70 by the pump 62, and the second coolant discharged from the outlet of the radiator 53 may be directed to the second coolant passage 83 of the heat exchanger 80 through the first port 71 and the second port 72 of the connector 70 by the pump 52. Accordingly, the second coolant circulation path 50 and the third coolant circulation path 60 may allow the second coolant and the third coolant to circulate independently of each other.

When the control valve 66 fluidly connects the first port 66*a* to the third port 66*c* and closes the second port 66*b* by the controller 100, the second coolant circulation path 50 and the third coolant circulation path 60 may be fluidly connected to each other, and accordingly the coolant (the second coolant and the third coolant) may be joined through the control valve 66 and the connector 70. The coolant (the second coolant and the third coolant) discharged from the coolant passage 18*b* of the battery chiller 18 may sequentially pass through the connection line 65, the fifth port 75 and the second port 72 of the connector 70, the second coolant passage 83 of the heat exchanger 80, the radiator 53, the reservoir 59, the first port 71 and the third port 73 of the connector 70, the battery 61, and the battery warmer 63 by the pump 62 and the pump 52.

The controller 100 may be configured to control respective operations of the actuator 13*a* of the heating-side expansion valve 13, the actuator 19*a* of the chiller-side expansion valve 19, the compressor 11, an actuator of the shut-off valve 39, an actuator of the control valve 96, an actuator of the control valve 46, an actuator of the control valve 66, an actuator of the pump 42, an actuator of the pump 52, an actuator of the pump 62, and an actuator of the active air flap 5. Thus, the overall operation of the vehicle thermal management system may be controlled by the controller 100. According to an exemplary embodiment of the present disclosure, the controller 100 may be a full automatic temperature control (FATC) system.

The controller 100 may include a processor and a memory. The processor may be programmed to receive instructions stored in the memory, and transmit instructions to the various actuators. The memory may be a data store such as a hard disk drive, a solid state drive, a server, a volatile storage medium, and a non-volatile storage medium.

The vehicle thermal management system according to an exemplary embodiment of the present disclosure may include a first sensor T disposed on the downstream side of the radiator 53 of the second coolant subsystem 22, and the first sensor T may be configured to detect a temperature of the second coolant discharged from the radiator 53. The temperature of the second coolant detected by the first sensor T may be similar to or the same as an inlet-side coolant temperature at the second coolant passage 83 of the heat exchanger 80.

The vehicle thermal management system according to an exemplary embodiment of the present disclosure may include a second sensor PT disposed on the downstream side of the refrigerant passage 18*a* of the battery chiller 18 or the upstream side of the compressor 11. The second sensor PT may be configured to detect a suction pressure of the compressor 11, and the controller 100 may be configured to calculate a saturation temperature of the refrigerant passing through the refrigerant passage 81 of the heat exchanger 80 based on the suction pressure of the compressor 11 detected by the second sensor PT.

Figure 2:
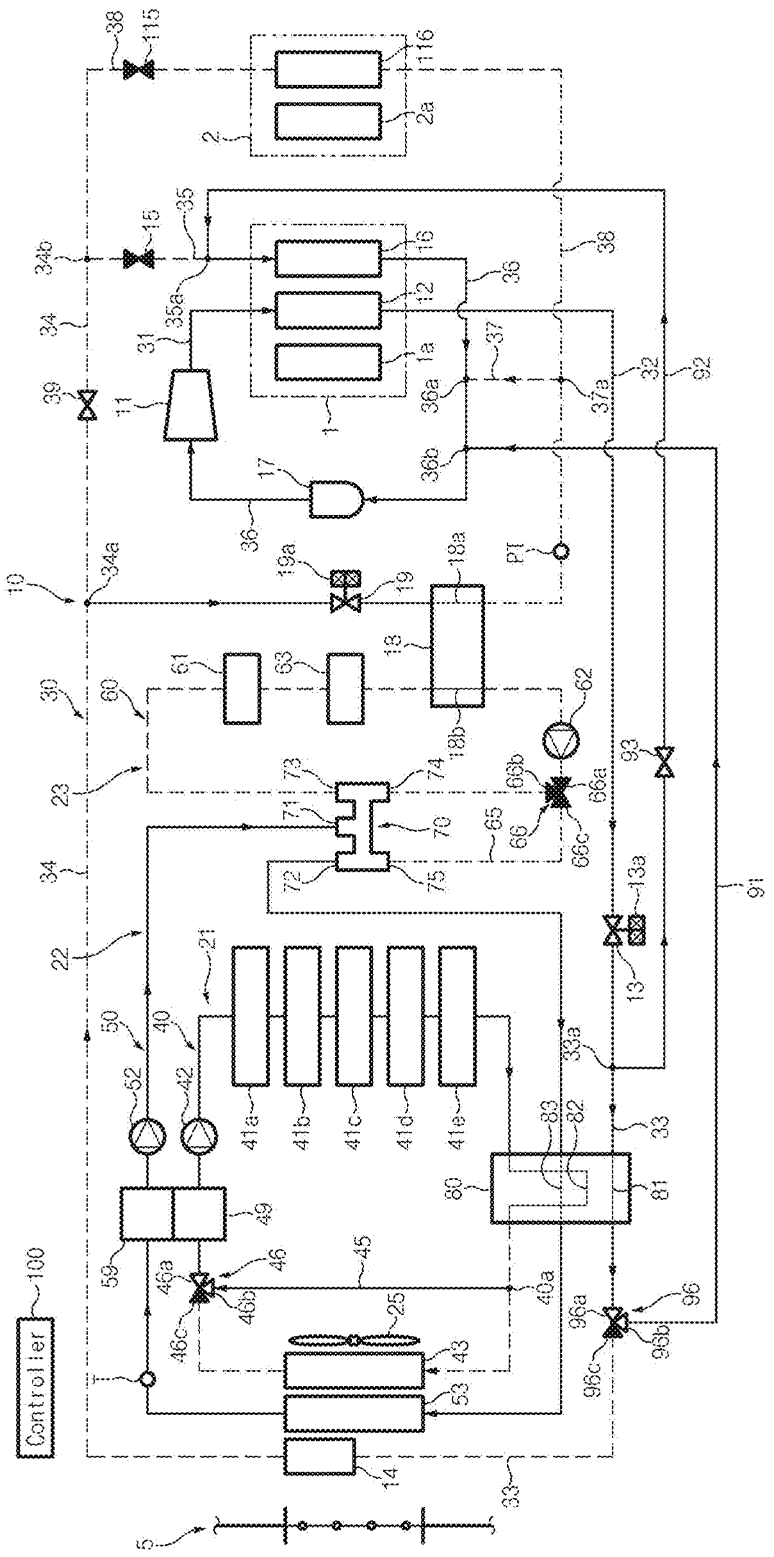
FIG. 2 illustrates a state in which a refrigerant subsystem operates in a heating mode and a first coolant subsystem operates in a waste-heat recovery mode in a vehicle thermal management system according to an exemplary embodiment of the present disclosure.

FIG. 2 illustrates a state in which the refrigerant subsystem 10 operates in a heating mode and the first coolant subsystem 21 operates in a waste-heat recovery mode in a vehicle thermal management system according to an exemplary embodiment of the present disclosure.

Referring to FIG. 2, the refrigerant compressed by the compressor 11 may be directed to the internal condenser 12, and the refrigerant may be condensed by the internal condenser 12. The refrigerant discharged from the internal condenser 12 may be expanded by the heating-side expansion valve 13, and the refrigerant discharged from the heating-side expansion valve 13 may pass through the refrigerant passage 81 of the heat exchanger 80. The control valve 96 may fluidly connect the first port 96*a* to the second port 96*b* by the controller 100 so that the refrigerant discharged from the refrigerant passage 81 of the heat exchanger 80 may be directed to the compressor 11 through the heating-side bypass line 91.

Referring to FIG. 2, the control valve 46 of the first coolant subsystem 21 may fluidly connect the first port 46*a* to the second port 46*b* so that the first coolant may pass through the bypass line 45. The first coolant may bypass the PE radiator 43, and the first coolant may circulate through the PE components 41*a*, 41*b*, 41*c*, 41*d*, and 41*e*, the first coolant passage 82 of the heat exchanger 80, and the reservoir 49 by the pump 42. As the first coolant bypasses the PE radiator 43, the first coolant may not be heated by the PE radiator 43. The first coolant may be heated by the waste heat of the PE components 41*a*, 41*b*, 41*c*, 41*d*, and 41*e*, and the heated first coolant may pass through the first coolant passage 82 of the heat exchanger 80 so that only the waste heat of the PE components 41*a*, 41*b*, 41*c*, 41*d*, and 41*e* may be transferred to the refrigerant passing through the refrigerant passage 81 of the heat exchanger 80 (waste-heat recovery mode). That is, the first coolant subsystem 21 may operate in the waste-heat recovery mode in which the waste heat of the PE components 41*a*, 41*b*, 41*c*, 41*d*, and 41*e* is recovered by the heat exchanger 80.

Referring to FIG. 2, the control valve 66 may close the first port 66*a*, the second port 66*b*, and the third port 66*c* by the controller 100, and the pump 62 of the third coolant subsystem 23 may be stopped by the controller 100 so that the third coolant may not pass through the battery 61, the battery warmer 63, and the coolant passage 18*b* of the battery chiller 18. As the pump 52 of the second coolant subsystem 22 operates, the second coolant may pass through the radiator 53 and the second coolant passage 83 of the heat exchanger 80, and accordingly heat may be transferred between the second coolant passing through the second coolant passage 83 of the heat exchanger 80 and the refrigerant passing through the refrigerant passage 81 of the heat exchanger 80.

As described above, when the refrigerant subsystem 10 operates in the heating mode, the refrigerant discharged from the internal condenser 12 may be expanded by the heating-side expansion valve 13, and the expanded refrigerant may pass through the refrigerant passage 81 of the heat exchanger 80. While the vehicle is driving, the PE components 41*a*, 41*b*, 41*c*, 41*d*, and 41*e* may operate and generate heat. As the first coolant passes through the PE components 41*a*, 41*b*, 41*c*, 41*d*, and 41*e* by the pump 42 of the first coolant subsystem 21, the first coolant may be heated by the waste heat of the PE components 41*a*, 41*b*, 41*c*, 41*d*, and 41*e*, and the heated first coolant may pass through the first coolant passage 82 of the heat exchanger 80. As the second coolant passes through the radiator 53 by the pump 52 of the second coolant subsystem 22, the second coolant may be cooled by the radiator 53, and the cooled second coolant may pass through the second coolant passage 83 of the heat exchanger 80.

When the vehicle is driving in a state in which the refrigerant subsystem 10 operates in the heating mode, the temperatures of the PE components 41*a*, 41*b*, 41*c*, 41*d*, and 41*e* may continue to increase, and accordingly the temperature (saturation temperature) of the refrigerant in the heat exchanger 80 may be relatively increased by the first coolant, and the second coolant may exchange heat with the ambient air through the radiator 53 so that the temperature of the second coolant may be relatively lowered. When the temperature of the refrigerant flowing into the refrigerant passage 81 of the heat exchanger 80 is higher than the temperature of the second coolant flowing into the second coolant passage 83 of the heat exchanger 80, heat may be transferred from the refrigerant flowing into the heat exchanger 80 to the second coolant flowing into the second coolant passage 83 of the heat exchanger 80. Accordingly, thermal energy loss of the refrigerant in the heat exchanger 80 may excessively occur, and thus evaporation of the refrigerant in the heat exchanger 80 may not smoothly occur. To deal with this, when the temperature of the refrigerant flowing into the refrigerant passage 81 of the heat exchanger 80 is higher than the temperature of the second coolant flowing into the second coolant passage 83 of the heat exchanger 80, the controller 100 may stop the pump 52 of the second coolant subsystem 22 to thereby block the second coolant from flowing into the second coolant passage 83 of the heat exchanger 80, and thus the thermal energy loss of the refrigerant flowing into the refrigerant passage 81 of the heat exchanger 80 may be prevented.

According to an exemplary embodiment of the present disclosure, when the vehicle is driving in a state in which the refrigerant subsystem 10 operates in the heating mode, the controller 100 may be configured to allow the first coolant subsystem 21 to operate in the waste-heat recovery mode or stop operating in the waste-heat recovery mode based on a temperature difference (Tm−Te) between a temperature Tm of any one PE component of the PE components 41*a*, 41*b*, 41*c*, 41*d*, and 41*e* and an ambient temperature Te. According to an exemplary embodiment of the present disclosure, when the temperature difference (Tm−Te) between the temperature Tm of the PE component and the ambient temperature Te is greater than a first threshold A, the controller 100 may be configured to allow the first coolant subsystem 21 to operate in the waste-heat recovery mode by controlling the control valve 46 so that allows the first coolant to bypass the PE radiator 43 through the bypass line 45. The first threshold A may be a temperature difference allowing the refrigerant passing through the refrigerant passage 81 of the heat exchanger 80 to be easily evaporated by the waste heat of the PE components 41*a*, 41*b*, 41*c*, 41*d*, and 41*c*.

According to an exemplary embodiment of the present disclosure, the controller 100 may be configured to control the operation of the pump 52 of the second coolant subsystem 22 based on the temperature of the refrigerant flowing into an inlet of the refrigerant passage 81 of the heat exchanger 80, the temperature of the second coolant flowing into an inlet of the second coolant passage 83 of the heat exchanger 80, and the temperature difference (Tm−Te) between the temperature Tm of the PE component and the ambient temperature Te.

According to an exemplary embodiment of the present disclosure, when the temperature of the refrigerant flowing into the refrigerant passage 81 of the heat exchanger 80 is higher than the temperature of the second coolant flowing into the second coolant passage 83 of the heat exchanger 80, the controller 100 may be configured for controlling the operation of the pump 52 so that gradually reduces revolutions per minute (rpm) of the pump 52 of the second coolant subsystem 22 and stops the pump 52.

According to an exemplary embodiment of the present disclosure, when an inlet-side refrigerant temperature Tr detected at the inlet of the refrigerant passage 81 of the heat exchanger 80 is higher than an inlet-side coolant temperature Tc detected at the inlet of the second coolant passage 83 of the heat exchanger 80, the controller 100 may be configured to stop the pump 52 of the second coolant subsystem 22.

According to another exemplary embodiment of the present disclosure, when the sum (T2+F) of a saturation temperature T2 of the refrigerant calculated based on the suction pressure of the compressor 11 detected by the second sensor PT and a correction temperature F is higher than a coolant temperature T1 detected by the first sensor T disposed on the downstream side of the radiator 53, the controller 100 may be configured to stop the pump 52 of the second coolant subsystem 22.

According to another exemplary embodiment of the present disclosure, when the temperature difference (Tm−Te) between the temperature Tm of the PE component and the ambient temperature Te is greater than a second threshold B, the controller 100 may be configured to stop the pump 52 of the second coolant subsystem 22. The second threshold B may be greater than the first threshold A. For example, the second threshold B may be 23-28° C., and the second threshold B may be varied depending on the ambient temperature.

According to an exemplary embodiment of the present disclosure, when the temperature difference (Tm−Te) between the temperature Tm of the PE component and the ambient temperature Te is less than or equal to a third threshold C, the controller 100 may be configured to allow the first coolant subsystem 21 to stop operating in the waste-heat recovery mode, and operate the pump 52 of the second coolant subsystem 22. When the vehicle is temporarily stopped after driving for a certain time period or the vehicle speed is relatively reduced, the heat generating amount of the PE components 41*a*, 41*b*, 41*c*, 41*d*, and 41*e* may be relatively reduced. That is, the waste heat of the PE components 41*a*, 41*b*, 41*c*, 41*d*, and 41*e* may be relatively reduced. The third threshold C may be less than the first threshold A. For example, the third threshold C may be 10° C.

Figure 3:
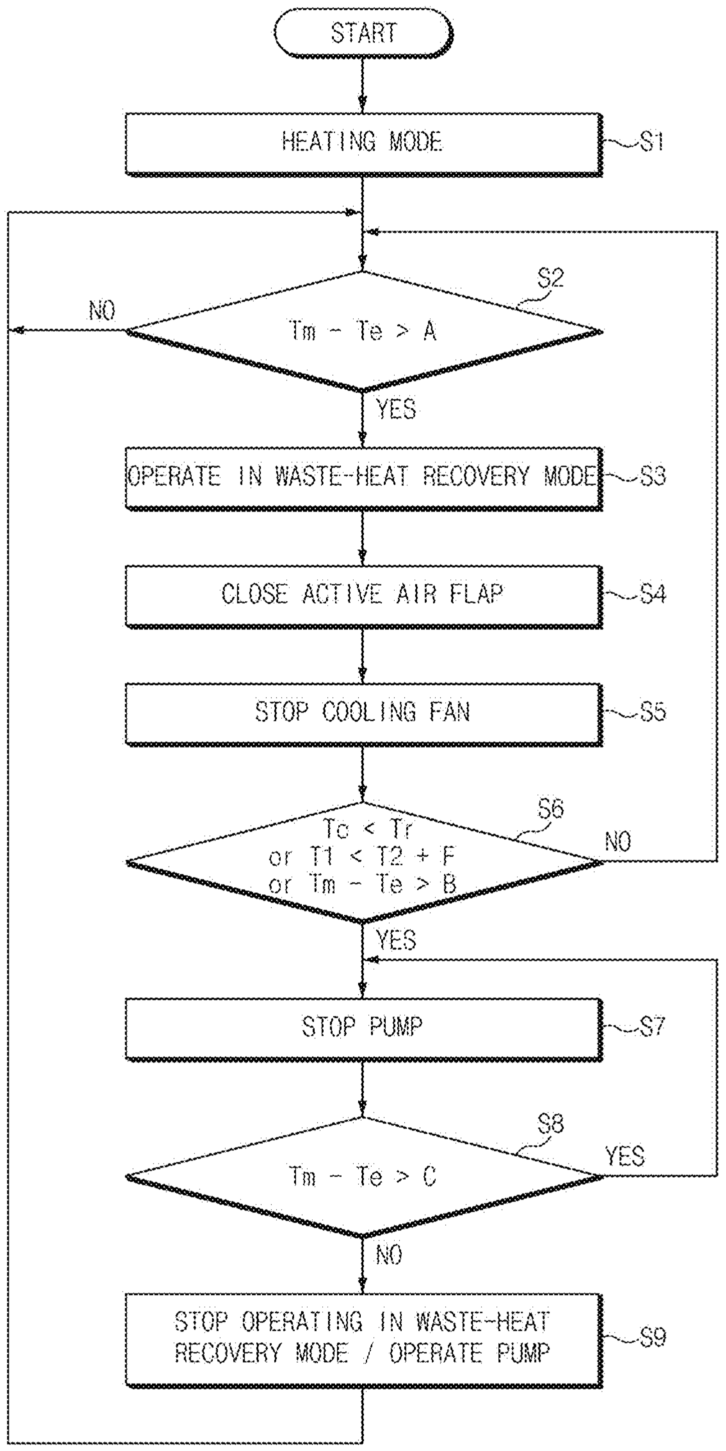
FIG. 3 illustrates a flowchart of a method for controlling a vehicle thermal management system according to an exemplary embodiment of the present disclosure.

FIG. 3 illustrates a flowchart of a method for controlling a vehicle thermal management system according to an exemplary embodiment of the present disclosure.

Referring to FIG. 3, the controller 100 may allow the refrigerant subsystem 10 to operate in a heating mode and drive the vehicle (S1).

The controller 100 may be configured to determine whether a temperature difference (Tm−Te) between a temperature Tm of the PE component and an ambient temperature Te is greater than a first threshold A (S2). The first threshold A may be a temperature difference allowing the refrigerant passing through the refrigerant passage 81 of the heat exchanger 80 to be easily evaporated by the waste heat of the PE components 41*a*, 41*b*, 41*c*, 41*d*, and 41*e*. For example, the first threshold A may be 15° C.

When the controller 100 determines that the temperature difference (Tm−Te) between the temperature Tm of the PE component and the ambient temperature Te is greater than the first threshold A, the first coolant subsystem 21 may operate in a waste-heat recovery mode (S3). When the controller 100 determines that the temperature difference (Tm−Te) between the temperature Tm of the PE component and the ambient temperature Te is less than or equal to the first threshold A, the method according to the exemplary embodiment of the present disclosure may return to S2.

The controller 100 may close the active air flap 5 (S4).

The controller 100 may stop the cooling fan 25 (S5).

The controller 100 may calculate a temperature of the refrigerant flowing into the refrigerant passage 81 of the heat exchanger 80 and a temperature of the second coolant flowing into the second coolant passage 83 of the heat exchanger 80, and determine whether the temperature of the refrigerant flowing into the refrigerant passage 81 of the heat exchanger 80 is higher than the temperature of the second coolant flowing into the second coolant passage 83 of the heat exchanger 80 (S6).

According to an exemplary embodiment of the present disclosure, the controller 100 may be configured to determine whether an inlet-side refrigerant temperature Tr detected at the inlet of the refrigerant passage 81 of the heat exchanger 80 is higher than an inlet-side coolant temperature Tc detected at the inlet of the second coolant passage 83 of the heat exchanger 80 (Tc<Tr) (S6).

According to another exemplary embodiment of the present disclosure, the controller 100 may be configured to determine whether the sum (T2+F) of a saturation temperature T2 of the refrigerant calculated based on a suction pressure of the compressor 11 detected by the second sensor PT and a correction temperature F is higher than a coolant temperature T1 detected by the first sensor T (T1<T2+F) (S6). The saturation temperature T2 of the refrigerant may correspond to the inlet-side refrigerant temperature Tr detected at the inlet of the refrigerant passage 81 of the heat exchanger 80, and the correction temperature F may be a difference between the saturation temperature T2 of the refrigerant and the inlet-side refrigerant temperature Tr. For example, the correction temperature F may be 3-5° C.

According to another exemplary embodiment of the present disclosure, the controller 100 may be configured to determine whether the temperature difference (Tm−Te) between the temperature Tm of the PE component and the ambient temperature Te is greater than a second threshold B (S6). The second threshold B may be greater than the first threshold A. For example, the second threshold B may be 23-28° C., and the second threshold B may be varied depending on the ambient temperature. When the temperature difference (Tm−Te) between the temperature Tm of the PE component and the ambient temperature Te is greater than the second threshold B, the temperature of the refrigerant passing through the refrigerant passage 81 of the heat exchanger 80 may be higher than the temperature of the second coolant passing through the second coolant passage 83 of the heat exchanger 80.

When it is determined that the temperature of the refrigerant flowing into the refrigerant passage 81 of the heat exchanger 80 is higher than the temperature of the second coolant flowing into the second coolant passage 83 of the heat exchanger 80, the controller 100 may gradually reduce revolutions per minute (rpm) of the pump 52 of the second coolant subsystem 22 to thereby stop the pump 52 (S7).

When it is determined that the temperature of the refrigerant flowing into the refrigerant passage 81 of the heat exchanger 80 is lower than or equal to the temperature of the second coolant flowing into the second coolant passage 83 of the heat exchanger 80, the method according to the exemplary embodiment of the present disclosure may return to S2.

According to an exemplary embodiment of the present disclosure, when it is determined that the inlet-side refrigerant temperature Tr detected at the inlet of the refrigerant passage 81 of the heat exchanger 80 is higher than the inlet-side coolant temperature Tc detected at the inlet of the second coolant passage 83 of the heat exchanger 80 (Tc<Tr), the controller 100 may stop the pump 52 of the second coolant subsystem 22 (S7). When it is determined that the inlet-side refrigerant temperature Tr detected at the inlet of the refrigerant passage 81 of the heat exchanger 80 is lower than or equal to the inlet-side coolant temperature Tc detected at the inlet of the second coolant passage 83 of the heat exchanger 80, the method according to the exemplary embodiment of the present disclosure may return to S2.

According to another exemplary embodiment of the present disclosure, when it is determined that the sum (T2+F) of the saturation temperature T2 of the refrigerant calculated based on the suction pressure of the compressor 11 detected by the second sensor PT and the correction temperature F is greater than the coolant temperature T1 detected by the first sensor T (T1<T2+F), the controller 100 may stop the pump 52 of the second coolant subsystem 22 (S7). When it is determined that the sum (T2+F) of the saturation temperature T2 of the refrigerant and the correction temperature F is lower than or equal to the coolant temperature T1 detected by the first sensor T, the method according to the exemplary embodiment of the present disclosure may return to S2.

According to another exemplary embodiment of the present disclosure, when it is determined that the temperature difference (Tm−Te) between the temperature Tm of the PE component and the ambient temperature Te is greater than the second threshold B (Tm−Te>B), the controller 100 may stop the pump 52 of the second coolant subsystem 22 (S7). When it is determined that the temperature difference (Tm−Te) between the temperature Tm of the PE component and the ambient temperature Te is less than or equal to the second threshold B, the method according to the exemplary embodiment of the present disclosure may return to S2.

After the pump 52 of the second coolant subsystem 22 is stopped, the controller 100 may be configured to determine whether the temperature difference (Tm−Te) between the temperature Tm of the PE component and the ambient temperature Te is greater than a third threshold C (Tm−Te>C) (S8). The third threshold C may be less than the first threshold A. For example, the third threshold C may be 10° C.

When it is determined that the temperature difference (Tm−Te) between the temperature Tm of the PE component and the ambient temperature Te is greater than the third threshold C, the method according to the exemplary embodiment of the present disclosure may return to S7.

When it is determined that the temperature difference (Tm−Te) between the temperature Tm of the PE component and the ambient temperature Te is less than or equal to the third threshold C, the controller 100 may allow the first coolant subsystem 21 to stop operating in the waste-heat recovery mode, and operate the pump 52 of the second coolant subsystem 22 at predetermined RPM (S9).

After the waste-heat recovery mode of the first coolant subsystem 21 is stopped, and the pump 52 of the second coolant subsystem 22 is operated, the method according to the exemplary embodiment of the present disclosure may return to S2.

As set forth above, the vehicle thermal management system and the method for controlling the same according to exemplary embodiments of the present disclosure may be designed to prevent the thermal energy loss of the refrigerant in the heat exchanger thermally connecting the first and second coolant subsystems and the refrigerant subsystem. Accordingly, as the refrigerant evaporation performance of the heat exchanger is improved, the refrigerant condensation performance of the internal condenser may be improved, and thus the cabin heating performance of the refrigerant subsystem may be improved. Furthermore, the usage of the electric heater may be reduced, so that the electric efficiency of the vehicle may be improved.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle thermal management system, comprising:

a refrigerant subsystem including a refrigerant circulation path;

a first coolant subsystem including a first coolant circulation path into which a first coolant flows and a power electronics (PE) component fluidly connected to the first coolant circulation path;

a second coolant subsystem including a second coolant circulation path, and a radiator and a pump fluidly connected to the second coolant circulation path;

a heat exchanger including a refrigerant passage fluidly connected to the refrigerant circulation path of the refrigerant subsystem, a first coolant passage fluidly connected to the first coolant circulation path of the first coolant subsystem, and a second coolant passage fluidly connected to the second coolant circulation path of the second coolant subsystem; and a controller operatively connected to the pump and configured to control the pump of the second coolant subsystem based on a temperature of a refrigerant flowing into the refrigerant passage of the heat exchanger and a temperature of a second coolant flowing into the second coolant passage of the heat exchanger;

a first sensor disposed on a downstream side of the radiator; and a second sensor disposed on an upstream side of a compressor of the refrigerant subsystem, wherein the controller is configured to calculate a saturation temperature of the refrigerant passing through the refrigerant passage of the heat exchanger based on a suction pressure of the compressor detected by the second sensor, and wherein the controller is further configured to stop the pump of the second coolant subsystem in response that a sum of the calculated saturation temperature of the refrigerant and a correction temperature is higher than a coolant temperature detected by the first sensor.

2. The vehicle thermal management system of claim 1, wherein the refrigerant subsystem further includes an evaporator, an internal condenser, and a refrigerant line connecting the internal condenser and the refrigerant passage of the heat exchanger, and a dehumidification-side bypass line connecting an upstream point of the refrigerant passage of the heat exchanger and an upstream point of the evaporator and allowing the refrigerant to bypass the heat exchanger.

3. The vehicle thermal management system of claim 2, wherein refrigerant subsystem further includes:

a compressor connected to the internal condenser; and a heating-side bypass line connecting a downstream point of the refrigerant passage of the heat exchanger and an upstream point of the compressor and allowing the refrigerant discharged from the refrigerant passage of the heat exchanger to bypass the evaporator to the compressor through the heating-side bypass line.

4. The vehicle thermal management system of claim 1, wherein the controller is further configured to stop the pump of the second coolant subsystem in response that the temperature of the refrigerant flowing into the refrigerant passage of the heat exchanger is higher than the temperature of the second coolant flowing into the second coolant passage of the heat exchanger, wherein the temperature of the refrigerant flowing into the refrigerant passage of the heat exchanger is determined by the second sensor, and wherein the temperature of the second coolant flowing into the second coolant passage of the heat exchanger by the first sensor.

5. The vehicle thermal management system of claim 1, wherein the controller is further configured to stop the pump of the second coolant subsystem in response that an inlet-side refrigerant temperature at an inlet of the refrigerant passage of the heat exchanger is higher than an inlet-side coolant temperature at an inlet of the second coolant passage of the heat exchanger, wherein the inlet-side refrigerant temperature at the inlet of the refrigerant passage of the heat exchanger is determined by the second sensor, and wherein the inlet-side coolant temperature at the inlet of the second coolant passage of the heat exchanger is determined by the first sensor.

6. The vehicle thermal management system of claim 1, wherein the first coolant subsystem further includes:

a PE radiator fluidly connected to the first coolant circulation path;

a bypass line connected to the first coolant circulation path at upstream and downstream of the PE radiator and allowing the first coolant to bypass the PE radiator; and a control valve configured to adjust the flow of the first coolant between the bypass line and the PE radiator.

7. The vehicle thermal management system of claim 6, wherein the controller operatively connected to the control valve is further configured to control the control valve to allow the first coolant to bypass the PE radiator through the bypass line in response that a temperature difference between a temperature of the PE component and an ambient temperature is greater than a first threshold.

8. The vehicle thermal management system of claim 7, wherein the controller is further configured to stop the pump of the second coolant subsystem in response that the temperature difference between the temperature of the PE component and the ambient temperature is greater than a second threshold, and wherein the second threshold is greater than the first threshold.

9. The vehicle thermal management system of claim 8, wherein the controller is further configured to operate the pump of the second coolant subsystem in response that the temperature difference between the temperature of the PE component and the ambient temperature is less than or equal to a third threshold, and wherein the third threshold is less than the first threshold.

10. A method for controlling a vehicle thermal management system including a refrigerant subsystem including a refrigerant circulation path, a first coolant subsystem including a first coolant circulation path into which a first coolant flows and a PE component fluidly connected to the first coolant circulation path, a second coolant subsystem including a second coolant circulation path and a radiator and a pump fluidly connected to the second coolant circulation path, and a heat exchanger including a refrigerant passage fluidly connected to the refrigerant circulation path of the refrigerant subsystem, a first coolant passage fluidly connected to the first coolant circulation path of the first coolant subsystem, and a second coolant passage fluidly connected to the second coolant circulation path of the second coolant subsystem, the method comprising:

obtaining, by a controller operatively connected to the pump, a temperature of a refrigerant flowing into the refrigerant passage of the heat exchanger and a temperature of a second coolant flowing into the second coolant passage of the heat exchanger; and controlling, by the controller, the pump of the second coolant subsystem based on the temperature of the refrigerant flowing into the refrigerant passage of the heat exchanger, the temperature of the second coolant flowing into the second coolant passage of the heat exchanger, and a temperature difference between a temperature of the PE component and an ambient temperature.

11. The method of claim 10, wherein the controlling of the pump includes stopping the pump of the second coolant subsystem in response that the temperature of the refrigerant flowing into the refrigerant passage of the heat exchanger is higher than the temperature of the second coolant flowing into the second coolant passage of the heat exchanger.

12. The method of claim 10, wherein the controlling of the pump includes stopping the pump of the second coolant subsystem in response that an inlet-side refrigerant temperature detected at an inlet of the refrigerant passage of the heat exchanger is higher than an inlet-side coolant temperature detected at an inlet of the second coolant passage of the heat exchanger.

13. The method of claim 10, wherein the controlling of the pump includes calculating a saturation temperature of the refrigerant passing through the refrigerant passage of the heat exchanger based on a suction pressure of a compressor of the refrigerant subsystem detected by a second sensor disposed on an upstream side of the compressor.

14. The method of claim 13, wherein the controlling of the pump includes stopping the pump of the second coolant subsystem in response that a sum of the calculated saturation temperature of the refrigerant and a correction temperature is higher than a coolant temperature detected by a first sensor disposed on a downstream side of the radiator.

15. The method of claim 14, wherein the controlling of the pump includes controlling a control valve operatively connected to the controller to allow the first coolant to bypass a PE radiator fluidly connected to the first coolant circulation path through a bypass line in response that the temperature difference between the temperature of the PE component and the ambient temperature is greater than a first threshold.

16. The method of claim 15, wherein the controlling of the pump includes stopping the pump of the second coolant subsystem in response that the temperature difference between the temperature of the PE component and the ambient temperature is greater than a second threshold, and wherein the second threshold is greater than the first threshold.

17. The method of claim 16, wherein the controlling of the pump includes operating the pump of the second coolant subsystem in response that the temperature difference between the temperature of the PE component and the ambient temperature is less than or equal to a third threshold, and wherein the third threshold is less than the first threshold.

* * * * *